US012667922B1

(12) United States Patent
Garner et al.

(10) Patent No.: US 12,667,922 B1
(45) Date of Patent: Jun. 30, 2026

(54) MACHINE TOOL SYSTEM WITH TOOL BASE AND REPOSITIONABLE AND RELOCATABLE WORKPIECE FRAME

(71) Applicant: Rolls-Royce Corporation, Indianapolis, IN (US)

(72) Inventors: Rusty Garner, Indianapolis, IN (US); Monica Munoz, Indianapolis, IN (US); Damon Ward, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 19/048,305

(22) Filed: Feb. 7, 2025

(51) Int. Cl.
     *B23Q 3/06* (2006.01)
(52) U.S. Cl.
     CPC .................................... *B23Q 3/065* (2013.01)
(58) Field of Classification Search
     CPC ...................................................... B23Q 3/063
     See application file for complete search history.

(56) References Cited

U.S. PATENT DOCUMENTS

| | | | | |
|---|---|---|---|---|
| 5,064,321 | A * | 11/1991 | Barnes | B23Q 3/103 |
| | | | | 409/219 |
| 6,186,867 | B1 * | 2/2001 | Dwyer | B24B 41/06 |
| | | | | 451/28 |
| 7,080,434 | B2 * | 7/2006 | Jones | B25B 5/003 |
| | | | | 29/281.1 |
| 8,490,956 | B2 * | 7/2013 | Korn | B25B 5/14 |
| | | | | 269/45 |
| 8,661,950 | B2 | 3/2014 | Hessbrueggen et al. | |

| | | | | |
|---|---|---|---|---|
| 9,498,861 | B2 | 11/2016 | Keller et al. | |
| 9,746,848 | B2 * | 8/2017 | Jarvis | G05B 19/402 |
| 10,711,611 | B2 * | 7/2020 | Stakelberg | B25B 5/14 |
| 10,940,548 | B2 | 3/2021 | Garces et al. | |
| 11,471,966 | B2 | 10/2022 | Fessler-Knobel et al. | |
| 12,023,771 | B2 * | 7/2024 | Mingot | B23Q 3/1543 |
| 2007/0234549 | A1 * | 10/2007 | Sherlock | F01D 5/14 |
| | | | | 29/559 |

FOREIGN PATENT DOCUMENTS

| | | | | |
|---|---|---|---|---|
| CN | 103659378 A * | 3/2014 | | B23Q 3/063 |
| CN | 102873558 B * | 12/2014 | | |
| CN | 204545534 U * | 8/2015 | | |
| CN | 211387734 U * | 9/2020 | | |
| CN | 113182906 A * | 7/2021 | | B23Q 3/065 |
| CN | 109733103 | 11/2024 | | |
| EP | 2146818 | 12/2012 | | |
| EP | 4032641 | 7/2022 | | |
| KR | 102084490 | 3/2020 | | |
| WO | 2016150665 | 9/2016 | | |

OTHER PUBLICATIONS

Translation of CN-102873558-B (Year: 2012).*
Translation of CN-204545534-U (Year: 2015).*
Translation of CN-211387734-U (Year: 2019).*

* cited by examiner

*Primary Examiner* — Jacob J Cigna
(74) *Attorney, Agent, or Firm* — Barnes & Thornburg

(57) ABSTRACT

A machine tool system includes a workpiece, a machine, and a workpiece frame. The workpiece frame is repositionable and relocatable on the machine in at least two different orientations to support the workpiece in the at least two different orientations during modification of the workpiece so that different sides of the workpiece are modified without requiring removal of the workpiece from the workpiece frame.

20 Claims, 6 Drawing Sheets

MACHINE TOOL SYSTEM WITH TOOL BASE AND REPOSITIONABLE AND RELOCATABLE WORKPIECE FRAME

FIELD OF THE DISCLOSURE

The present disclosure relates generally to machine tool systems, and more specifically to workpiece frames of machine tool systems.

BACKGROUND

Electrochemical machining (ECM) is a non-contact, non-thermal material removal process capable of small features, high quality surfaces, and high repeatability for production parts. Pulsed electrochemical machining (PECM), sometimes called precision electrochemical machining, is a more precise variant of ECM that uses a pulsed power supply.

Unlike many other manufacturing processes, there is no contact between the machining component or tool bit, which may be referred to as a cathode, and the workpiece in PECM. Material of the workpiece in close proximity to the machining component is dissolved by an electrochemical process, and the by-products are flushed away with a flowing electrolyte. The resulting workpiece has the shape that is an inverse of the machining component.

PECM provides some advantages over other manufacturing processes. For example, PECM may be used for relatively hard materials that may be difficult to machine using conventional methods. As another example, PECM can be used to machine small, intricate, or complex shapes or contours with a relatively high surface quality. Some workpieces may be easily distorted or non-repositionable and, thus, difficult to reposition during PECM.

SUMMARY

The present disclosure may comprise one or more of the following features and combinations thereof.

A machine tool system may comprise a thin-walled three-dimensional workpiece, a machine, and a workpiece frame. The machine may be configured to modify the thin-walled three-dimensional workpiece. The machine may include a tool base configured to support the thin-walled three-dimensional workpiece and a shaft spaced apart from the tool base along a first axis and configured to move along the first axis relative to the tool base to modify the thin-walled three-dimensional workpiece. The workpiece frame may be repositionable and relocatable on the tool base in at least two different orientations to support the thin-walled three-dimensional workpiece in the at least two different orientations relative to the first axis during modification of the thin-walled three-dimensional workpiece so that different sides of the thin-walled three-dimensional workpiece are modified without requiring removal of the thin-walled three-dimensional workpiece from the workpiece frame.

In some embodiments, the workpiece frame may include a C-shaped body, a workpiece locator, and a frame locator. The C-shaped body may be configured to be coupled to the tool base. The C-shaped body may define a workpiece-receiving space therein. The workpiece locator may extend from the C-shaped body into the workpiece-receiving space and into contact with the thin-walled three-dimensional workpiece to support and position the thin-walled three-dimensional workpiece relative to the C-shaped body. The frame locator may be arranged outside of the workpiece-receiving space and may extend away from the C-shaped body and into contact with the tool base to position the C-shaped body relative to the tool base so that the thin-walled three-dimensional workpiece is properly aligned with the shaft in the at least two different orientations.

In some embodiments, the C-shaped body of the workpiece frame may include a first arm, a second arm spaced apart from the first arm, and a third arm extending between and interconnecting terminal ends of the first arm and the second arm. The first arm, the second arm, and the third arm may cooperate to define the workpiece-receiving space.

In some embodiments, the workpiece locator may include a clamp extending inwardly from the C-shaped body into the workpiece-receiving space. The clamp may be configured to hold the thin-walled three-dimensional workpiece in a stationary position relative to the C-shaped body of the workpiece frame. The clamp may include a first clamp member extending inwardly from the first arm of the C-shaped body toward the second arm to support a first end of the thin-walled three-dimensional workpiece and a second clamp member extending inwardly from the second arm of the C-shaped body toward the first arm to support a second end of the thin-walled three-dimensional workpiece opposite the first end.

In some embodiments, the first clamp member may include a first clamp plate and a second clamp plate spaced apart from the first clamp plate to locate the first end of the thin-walled three-dimensional workpiece between the first clamp plate and the second clamp plate. The second clamp member may include a third clamp plate and a fourth clamp plate spaced apart from the third clamp plate to locate the second end of the thin-walled three-dimensional workpiece between the third clamp plate and the fourth clamp plate.

In some embodiments, the workpiece locator may further include a plurality of workpiece locating protrusions extending from the C-shaped body into the workpiece-receiving space and into contact with the thin-walled three-dimensional workpiece to locate the thin-walled three-dimensional workpiece within the workpiece-receiving space relative to the C-shaped body. The plurality of workpiece locating protrusions may include a first protrusion extending from the third arm of the C-shaped body into the workpiece-receiving space, a second protrusion extending from the third arm of the C-shaped body into the workpiece-receiving space and spaced apart from the first protrusion along the third arm, and a third protrusion extending from the second arm of the C-shaped body into the workpiece-receiving space.

In some embodiments, the frame locator may include a plurality of frame locating datums positioned outside of the workpiece-receiving space and extending from the C-shaped body and into contact with the tool base to locate the C-shaped body relative to the tool base. The plurality of frame locating datums may include a first datum coupled to the first arm of the C-shaped body, a second datum coupled to the third arm of the C-shaped body, and a third datum coupled to the third arm of the C-shaped body and spaced apart from the second datum.

In some embodiments, the frame locator may further include a plurality of pins arranged outside of the workpiece-receiving space and extending from the C-shaped body and into contact with a portion of the machine to couple the portion of the machine with the workpiece frame. Each of the plurality of pins may be coupled to the third arm of the C-shaped body and located between the second datum and the third datum along the third arm.

In some embodiments, the thin-walled three-dimensional workpiece includes a first side, a second side opposite the first side, and an edge interconnecting the first side and the second side. The workpiece frame may be repositionable and relocatable on the tool base so that the machine is configured to modify the first side, the second side, or the edge of the thin-walled three-dimensional workpiece by moving the shaft along the first axis.

According to another aspect of the present disclosure, a machine tool system may comprise a workpiece, a machine, and a workpiece frame. The machine may be configured to modify the workpiece. The workpiece frame may be repositionable and relocatable on the machine in at least two different orientations to support the workpiece in the at least two different orientations during modification of the workpiece so that different sides of the workpiece are modified without requiring removal of the workpiece from the workpiece frame. The workpiece frame may include a body, a workpiece locator, and a frame locator. The body may be configured to be coupled to the machine. The body may define a workpiece-receiving space therein. The workpiece locator may extend from the body into the workpiece-receiving space and into contact with the workpiece to support and position the workpiece relative to the body. The frame locator may be arranged outside of the workpiece-receiving space and may extend away from the body to position the body relative to the machine.

In some embodiments, the body of the workpiece frame may include a first arm, a second arm spaced apart from the first arm, and a third arm extending between and interconnecting terminal ends of the first arm and the second arm. The first arm, the second arm, and the third arm may cooperate to define the workpiece-receiving space. The workpiece locator may include a first clamp member extending from the first arm of the body toward the second arm and a second clamp member extending from the second arm of the body toward the first arm.

In some embodiments, the first clamp member may include a first clamp plate and a second clamp plate spaced apart from the first clamp plate to locate a first end of the workpiece between the first clamp plate and the second clamp plate. The second clamp member may include a third clamp plate and a fourth clamp plate spaced apart from the third clamp plate to locate a second end of the workpiece opposite the first end between the third clamp plate and the fourth clamp plate.

In some embodiments, the workpiece locator may further include a plurality of workpiece locating protrusions extending from the body into the workpiece-receiving space and into contact with the workpiece to locate the workpiece within the workpiece-receiving space relative to the body. The frame locator may include a plurality of frame locating datums positioned outside of the workpiece-receiving space and extending from the body and into contact with the machine to locate the body relative to the machine. The plurality of frame locating datums may include a first datum coupled to the first arm of the body, a second datum coupled to the third arm of the body, and a third datum coupled to the third arm of the body and spaced apart from the second datum.

According to another aspect of the present disclosure, a method of modifying a thin-walled three-dimensional workpiece may be provided. The method may comprise supporting the thin-walled three-dimensional workpiece on a workpiece frame. The method may comprise positioning the workpiece frame on a machine in a first position. The method may comprise, while the workpiece frame is in the first position, modifying a first side of the thin-walled three-dimensional workpiece via a shaft of the machine that moves along a first axis. The method may comprise removing the workpiece frame from the machine. The method may comprise repositioning the workpiece frame on the machine in a second position different than the first position. The method may comprise, while the workpiece frame is in the second position, modifying a second side of the thin-walled three-dimensional workpiece opposite the first side via the shaft of the machine that moves along the first axis.

In some embodiments, the method may further comprise, after the step of repositioning, removing the workpiece frame from the machine, repositioning the workpiece frame on the machine in a third position different than the first position and the second position, and while the workpiece frame is in the third position, modifying an edge of the thin-walled three-dimensional workpiece that interconnects the first side and the second side via the shaft of the machine that moves along the first axis.

In some embodiments, the step of supporting the thin-walled three-dimensional workpiece on a workpiece frame may include moving the thin-walled three-dimensional workpiece into engagement with a plurality of workpiece locating protrusions of the workpiece frame to position the thin-walled three-dimensional workpiece relative to and within a workpiece-receiving space of a C-shaped body of the workpiece frame.

In some embodiments, the step of positioning the workpiece frame on a machine in a first position may include moving the workpiece frame into contact with the machine so that a frame locator of the workpiece frame contacts the machine to position the C-shaped body relative to the machine. In some embodiments, the frame locator may be arranged outside of the workpiece-receiving space.

These and other features of the present disclosure will become more apparent from the following description of the illustrative embodiments.

DETAILED DESCRIPTION

Figure 1:
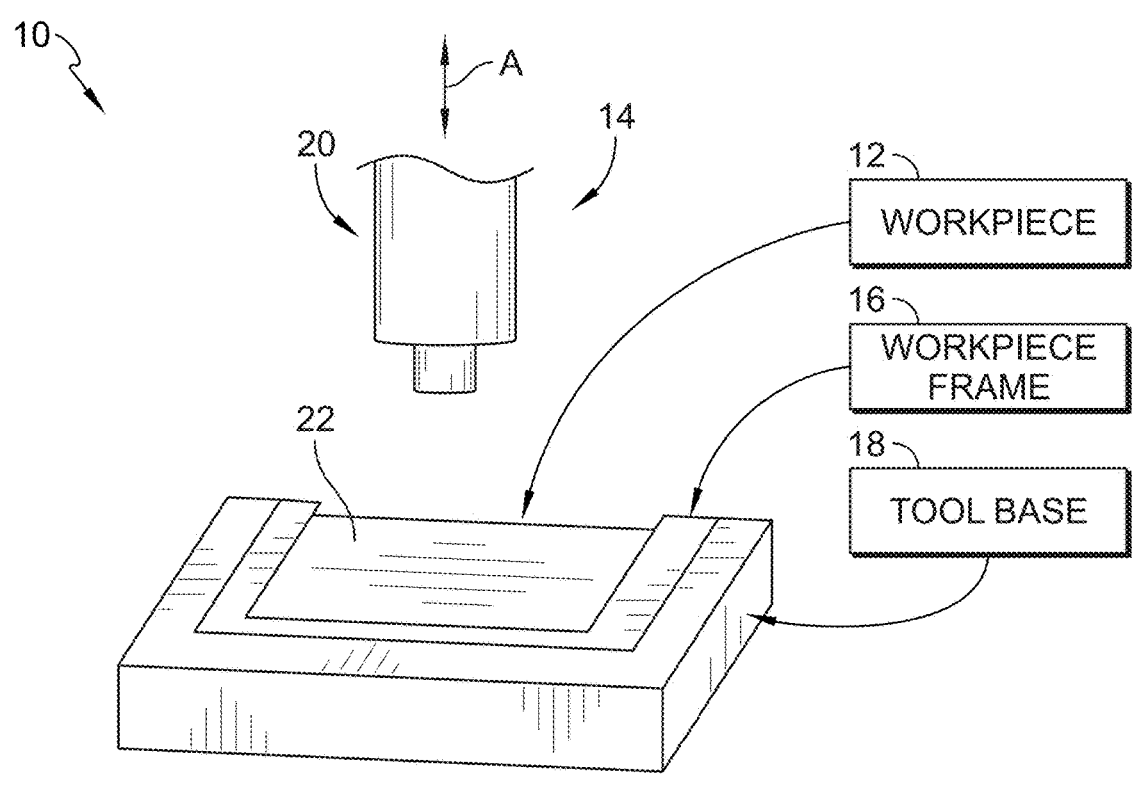
FIG. 1 is a diagrammatic view of a machine tool system including a workpiece frame removably coupled to a tool base of a machine in a first position, the workpiece frame supports a workpiece thereon in a first orientation relative to a shaft of the machine that modifies a first side of the workpiece by moving along a first axis.

For the purposes of promoting an understanding of the principles of the disclosure, reference will now be made to a number of illustrative embodiments illustrated in the drawings and specific language will be used to describe the same.

Figure 2:
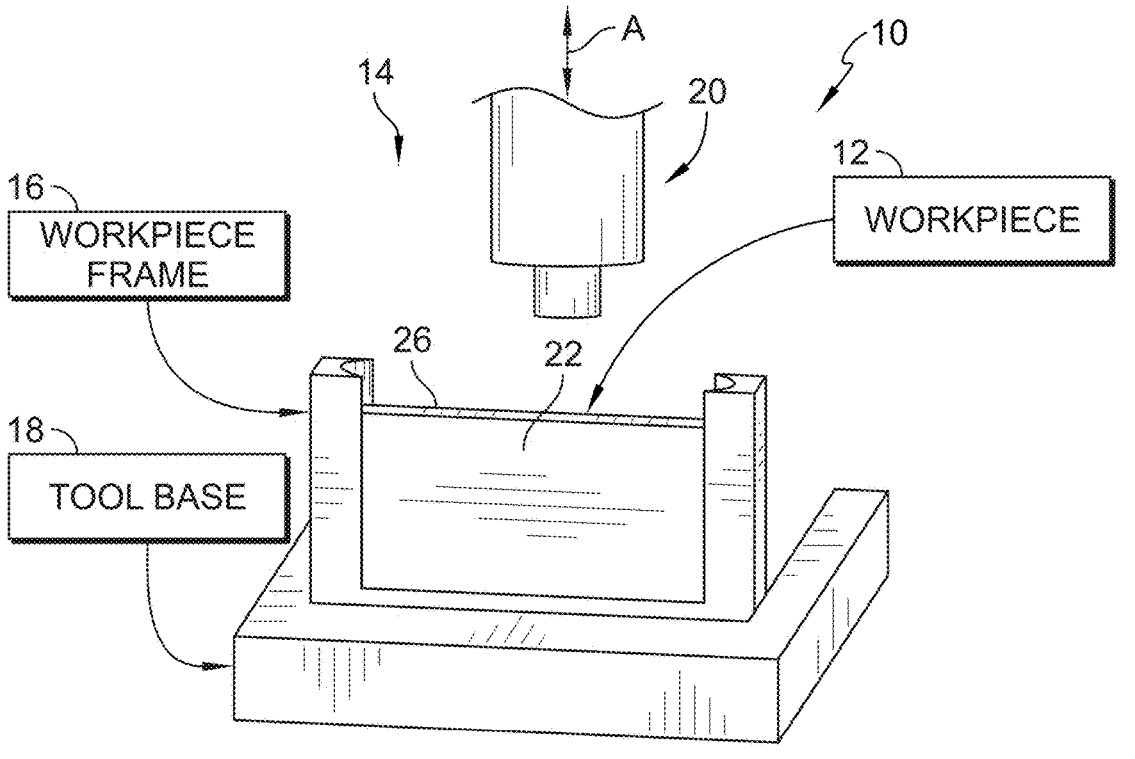
FIG. 2 is a diagrammatic view of the machine tool system of FIG. 1 showing the workpiece frame removably coupled to the tool base of the machine in a second position, the workpiece frame supports the workpiece thereon in a second orientation relative to the shaft of the machine that modifies an edge of the workpiece by moving along the first axis, the workpiece frame allowing for movement of the workpiece between the first and second orientations without requiring removal of the workpiece from the workpiece frame.

A machine tool system 10 includes a workpiece 12, a machine 14, and a workpiece frame 16, as shown in FIGS. 1 and 2. In illustrative embodiments, the workpiece 12 is a thin-walled three-dimensional workpiece. The machine 14 is configured to modify the workpiece 12. The workpiece frame 16 supports the workpiece 12 and is repositionable and relocatable on the machine 14 in different positions. The workpiece 12 remains stationary relative to the workpiece frame 16 such that repositioning of the workpiece frame 16 on the machine 14 also repositions the workpiece 12 such that different sides of the workpiece 12 may be modified by the machine 14 without requiring removal of the workpiece 12 from the workpiece frame 16.

The machine 14 includes a tool base 18 and a shaft 20, as shown in FIGS. 1 and 2. The tool base 18 supports the workpiece frame 16, and thus, the workpiece 12, relative to the shaft 20. The shaft 20 is spaced apart from the tool base 18 and moves along a first axis A to modify the workpiece 12. The workpiece frame 16 is configured to removably couple with the tool base 18 and is movable between at least a first orientation, as shown in FIG. 1, and a second orientation, as shown in FIG. 2. In the illustrative embodiment shown in FIGS. 1 and 2, the second orientation is offset by about 90 degrees compared to the first orientation. In other embodiments, the second orientation is offset by 180 degrees compared to the first orientation. In other embodiments, the second orientation may be offset from the first orientation by any suitable rotation angle and about any suitable axis through the workpiece frame 16.

In some embodiments, the machine 14 is capable of pulsed electrochemical machining (PECM). In such an embodiment, the shaft 20 or bit attached to the shaft 20 may be referred to as a cathode. To modify the workpiece 12, the shaft 20 moves toward the workpiece 12 and oscillates along the first axis A, but does not contact the workpiece 12. Once the shaft 20 is adjacent the workpiece 12 to form a gap therebetween, an electrolyte is injected into the gap. The electrolyte acts as an electron transfer medium to facilitate anodic dissolution of the material of the workpiece 12 adjacent the shaft 20. In some embodiments, the electrolyte may be a salt-based solution. The electrolyte allows electrical current to flow between the shaft 20 and the workpiece 12. Any by-products, such as, for example, metal hydroxides or hydrogen gas, of the electrochemical process are then flushed away by the electrolyte. The shaft 20 illustratively has a shape inverse to that of the desired workpiece 12 shape. In some embodiments, the shaft 20 may comprise titanium, stainless steel, copper, or any other suitable current carrying material.

Because PECM is a non-contact and non-thermal process, the workpiece 12 is not subjected to thermal or mechanical stresses. Additionally, because PECM is a non-contact and non-thermal process, the shaft 20 is not typically consumed or worn during the process of machining. In other embodiments, the machine 14 performs other subtractive or additive processes and may contact the workpiece 12. For example, the machine 14 may provide turning, milling, drilling, grinding, cutting, laser cutting, waterjet cutting, electrical discharge machining, plasma cutting, laser deposition, 3D printing, etc.

In some embodiments, the machine 14 is a single axis machine 14. In other words, the shaft 20 of the machine 14 only moves along the first axis A. Thus, to modify different sides of the workpiece 12, the workpiece 12 is repositioned such that the different sides may be modified by the shaft 20 moving along the first axis A. However, the workpiece 12 may be relatively thin and easily distorted or non-repositionable in conventional fixtures and any repositioning of the workpiece 12 itself may distort the workpiece 12. The workpiece frame 16 and the tool base 18 of the present disclosure provides the ability to reposition the workpiece 12 without removal of the workpiece 12 from the workpiece frame 16. In this way, the workpiece frame 16 is repositioned, which also repositions the workpiece 12, while allowing the workpiece 12 to remain stationary relative to the workpiece frame 16.

Figure 4:
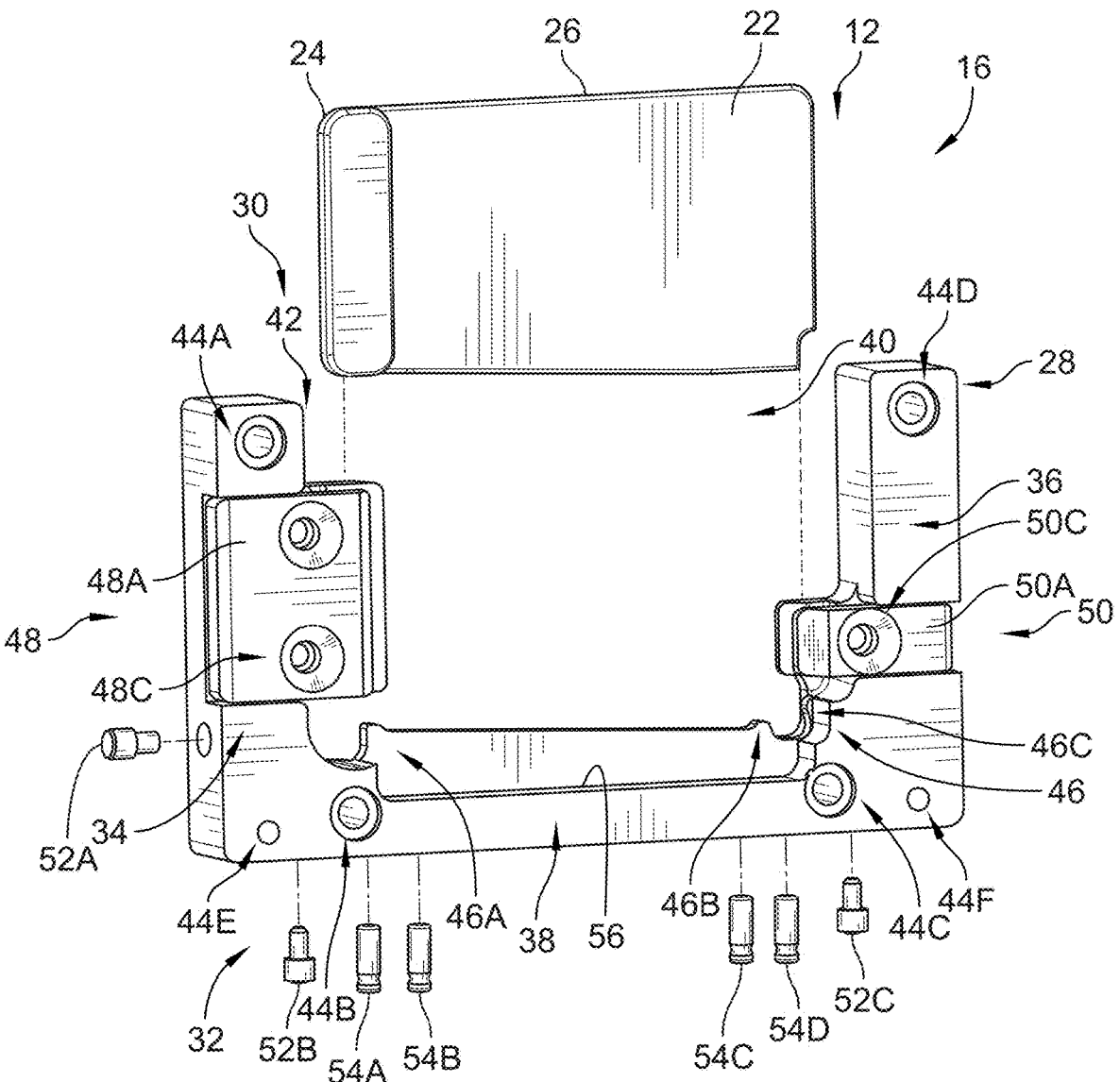
FIG. 4 is an exploded view of a portion of the machine tool system of FIG. 3 showing that, from top to bottom, the machine tool system includes the workpiece, the C-shaped body, and the frame locator, the frame locator having a plurality of frame locating datums that contacts the tool base to position the C-shaped body relative to the tool base and a plurality of pins that couples to a portion of the machine.

The workpiece 12 is illustratively a thin-walled three-dimensional workpiece, as shown in FIG. 4. The workpiece 12 includes a first side 22, a second side 24 opposite the first side 22, and an edge 26 that extends between and interconnects the first side 22 and the second side 24. The first side 22, the second side 24, and the edge 26 may each be modified by the machine 14 by repositioning the workpiece frame 16. In some embodiments, the workpiece 12 may be used in a gas turbine engine. For example, the workpiece 12 may form a part of a vane or a blade of a gas turbine engine. The workpiece 12 may provide a coversheet for a pressure side and/or a suction side of a vane or a blade.

As shown in FIGS. 1 and 2, the workpiece frame 16 is repositionable and relocatable on the tool base 18 in different positions to support the workpiece 12 in different orientations relative to the first axis A during modification of the workpiece 12 so that different sides of the workpiece 12 are modified without requiring removal of the workpiece 12 from the workpiece frame 16. As shown in FIG. 1, the workpiece frame 16 is in a first position relative to the tool base 18 and the shaft 20. While the workpiece frame 16 is in the first position, the workpiece 12 is in a first orientation relative to the first axis A. In the first orientation of the workpiece 12, the first side 22 of the workpiece 12 is modified. The first orientation of the workpiece 12 may be an orientation with the first side 22 facing upwardly toward the shaft 20.

As shown in FIG. 2, the workpiece frame 16 is in a second position relative to the tool base 18 and the shaft 20. While the workpiece frame 16 is in the second position, the workpiece 12 is in a second orientation relative to the first axis A. In the second orientation of the workpiece 12, the edge 26 of the workpiece 12 is modified. The second orientation of the workpiece 12 may be an orientation with the edge 26 facing upwardly toward the shaft 20.

Though two different positions of the workpiece frame 16 and two different orientations of the workpiece 12 are shown, it will be understood that additional positions and orientations may be used. For example, the workpiece frame 16 may be moved to a third position relative to the tool base 18 and the shaft 20. While the workpiece frame 16 is in the third position, the workpiece 12 is in a third orientation relative to the first axis A. In the third orientation of the workpiece 12, the second side 24 of the workpiece 12 is modified as an example. The third orientation of the workpiece 12 may be an orientation with the second side 24 facing upwardly toward the shaft 20. In other words, the third position may be a flipped position of the first position. To move the workpiece frame 16 between each position, the workpiece frame 16 may be removed from the tool base 18 and reattached to the tool base 18 in a different position.

Figure 3:
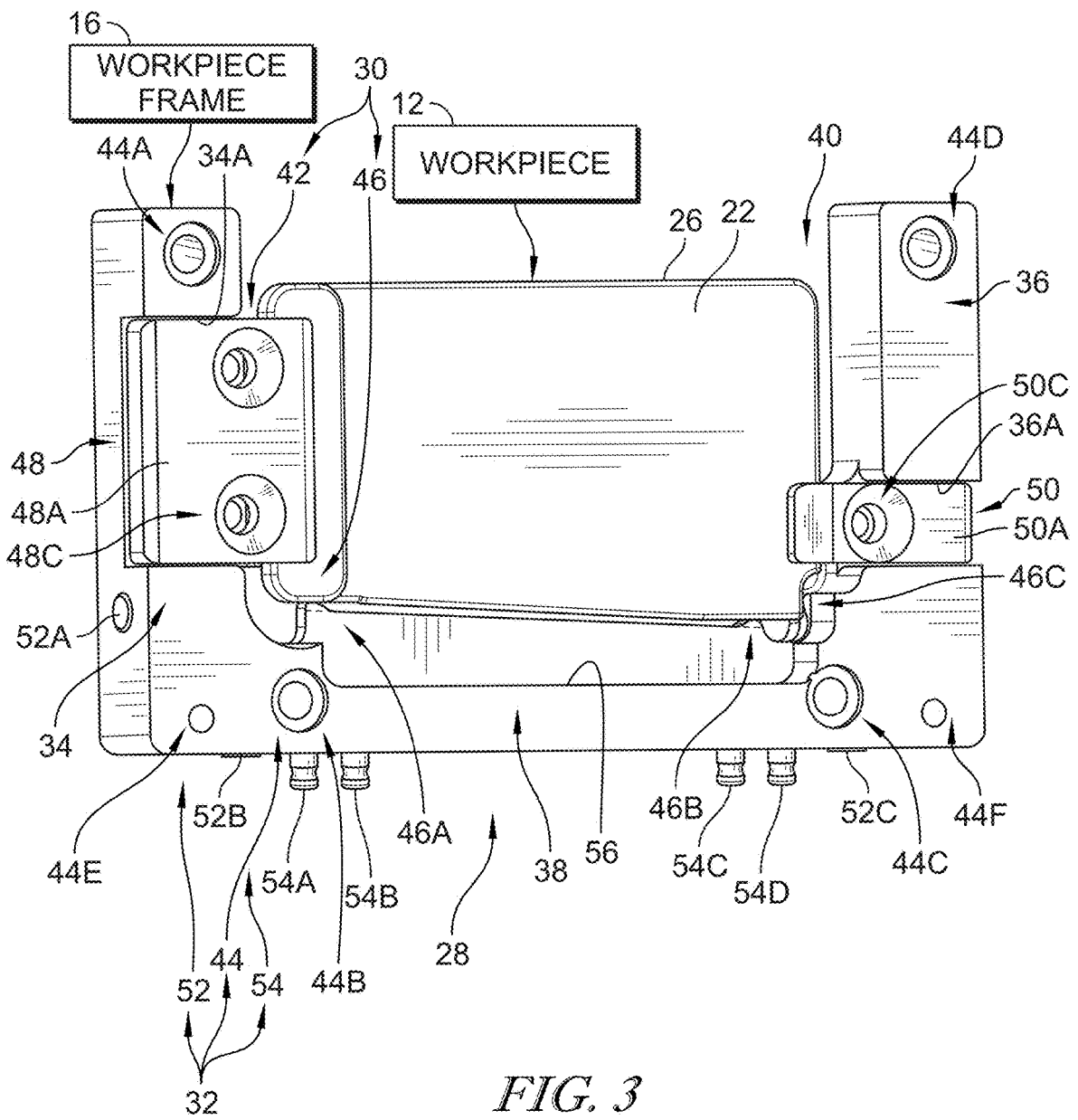
FIG. 3 is a perspective view of a portion of the machine tool system of FIG. 1 showing that the workpiece frame includes a C-shaped body that defines a workpiece-receiving space therein, a workpiece locator that extends from the C-shaped body into the workpiece-receiving space to position the workpiece relative to the C-shaped body, and a frame locator that extends from the C-shaped body outside of the workpiece-receiving space to position the C-shaped body relative to the tool base of the machine so that the workpiece is properly aligned with the shaft in both of the first and second orientations.

The workpiece frame 16 includes a body 28, a workpiece locator 30, and a frame locator 32, as shown in FIGS. 3 and 4. The body 28 is configured to be coupled to the tool base 18 in the different positions. The workpiece locator 30 contacts the workpiece 12 to position the workpiece 12 relative to the body 28. The frame locator 32 contacts the tool base 18 to position the body 28 relative to the tool base 18. Precise positioning of the workpiece 12 relative to the body 28 and the body 28 relative to the tool base 18 ensures that the workpiece 12 is properly aligned with the shaft 20 in the different orientations of the workpiece 12.

In illustrative embodiments, the body 28 is C-shaped, as shown in FIG. 3. The C-shaped body 28 provides open access to the edge 26 of the workpiece 12, as shown in FIGS. 2 and 3. This open access allows the machine 14 to more readily modify the workpiece 12. The C-shaped body 28, thus, provides access to three sides of the workpiece 12, including the first side 22, the second side 24, and the edge 26. In some embodiments, the body 28 may not be C-shaped.

The body 28 includes a first arm 34, a second arm 36, and a third arm 38. The first arm 34 and the second arm 36 are spaced apart from one another, and the third arm 38 extends between and interconnects first terminal ends of the first arm 34 and the second arm 36. Because the body 28 is C-shaped, second terminal ends of the first arm 34 and the second arm 36 are not interconnected, as shown in FIG. 3. The first arm 34, the second arm 36, and the third arm 38 cooperate to define a workpiece-receiving space 40.

Figures 5, 6:
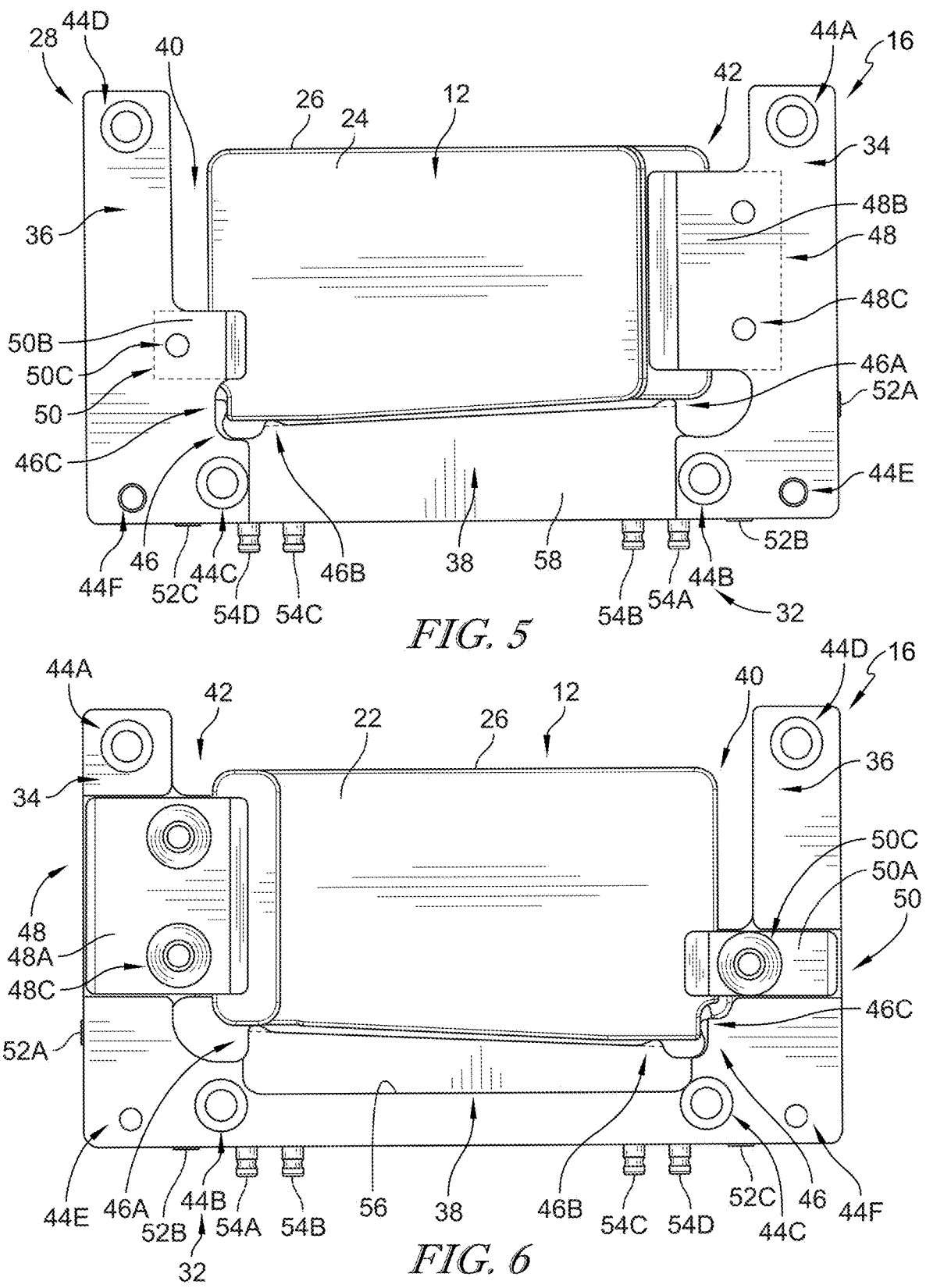
FIG. 5 is a back elevation view of a portion of the machine tool system of FIG. 3 showing that the C-shaped body of the workpiece frame allows for access to the edge of the workpiece, and further showing that the workpiece locator includes a first clamp member that clamps a first end of the workpiece, a second clamp member that clamps a second end of the workpiece, and a plurality of workpiece locating protrusions that extends from the C-shaped body into the workpiece-receiving space and into contact with the workpiece to locate the workpiece relative to the C-shaped body.
FIG. 6 is a front elevation view of a portion of the machine tool system of FIG. 3 showing that the plurality of frame locating datums is positioned outside of the workpiece-receiving space and extends away from the C-shaped body, and further showing that the plurality of pins is positioned outside of the workpiece-receiving space between two of the plurality of frame locating datums.

Illustratively, the arms 34, 36, 38 each define planar surfaces, as shown in FIGS. 5 and 6. For example, a front surface of each arm 34, 36, 38, as shown in FIG. 6, is substantially planar. As another example, a back surface of each arm 34, 36, 38, as shown in FIG. 5, is substantially planar. As another example, an outwardly-facing side surface of each arm 34, 36, 38, as shown in FIG. 3, is substantially planar. The substantially planar side surfaces act as primary datums for positioning the workpiece frame 16 in the tool base 18. The primary datums ensure proper alignment of the body 28 with the tool base 18.

The workpiece locator 30 includes a clamp 42 and a plurality of workpiece locating protrusions 46, as shown in FIGS. 3 and 4. The clamp 42 is coupled to the body 28 and extends into the workpiece-receiving space 40 to couple with the workpiece 12. The plurality of workpiece locating protrusions 46 extends into the workpiece-receiving space 40 from the body 28 to contact and locate the workpiece 12.

The clamp 42 illustratively includes a first clamp member 48 and a second clamp member 50 spaced apart from the first clamp member 48, as shown in FIGS. 3-6. The first clamp member 48 extends inwardly from the first arm 34 of the body 28 toward the second arm 36. The first clamp member 48 includes a first clamp plate 48A and a second clamp plate 48B spaced apart from the first clamp plate 48A to locate a first end of the workpiece 12 between the first clamp plate 48A and the second clamp plate 48B. In some embodiments, the first arm 34 is formed to define a recess 34A that receives the first clamp plate 48A therein.

The second clamp member 50 extends inwardly from the second arm 36 of the body 28 toward the first arm 34 and the first clamp member 48, as shown in FIG. 3. The second clamp member 50 includes a third clamp plate 50A and a fourth clamp plate 50B spaced apart from the third clamp plate 50A to locate a second end of the workpiece 12 between the third clamp plate 50A and the fourth clamp plate 50B. In some embodiments, the second arm 36 is formed to define a recess 36A that receives the third clamp plate 50A therein. The first clamp member 48 and the second clamp member 50 support opposing ends of the workpiece 12 to hold the workpiece 12 in a stationary position relative to the body 28, as suggested in FIGS. 5 and 6.

Figure 7:
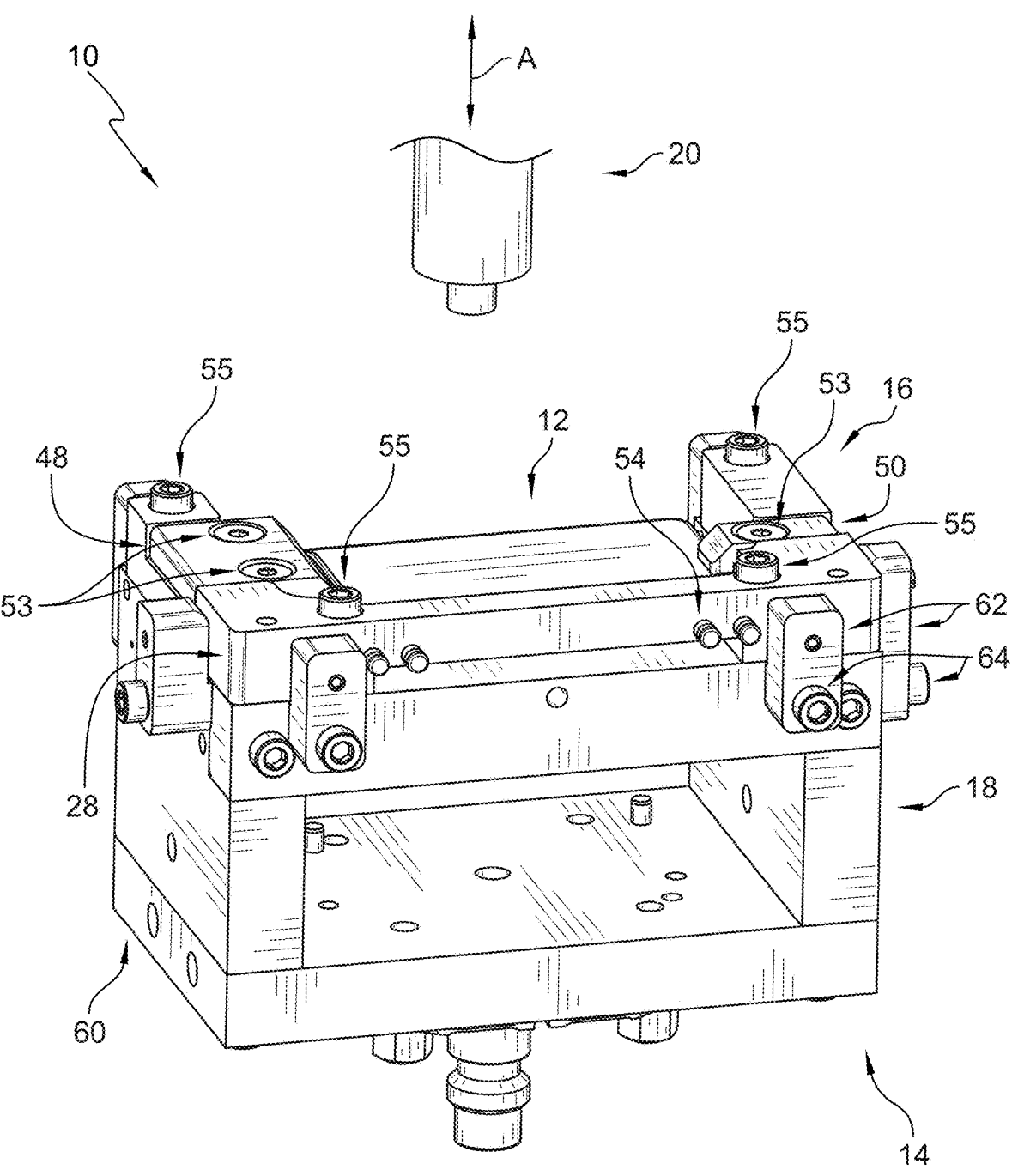
FIG. 7 is a perspective view of the workpiece frame coupled to an exemplary tool base showing that the exemplary tool base includes locator blocks that contact the plurality of frame locating datums to position the C-shaped body relative to the tool base.
Figure 8:
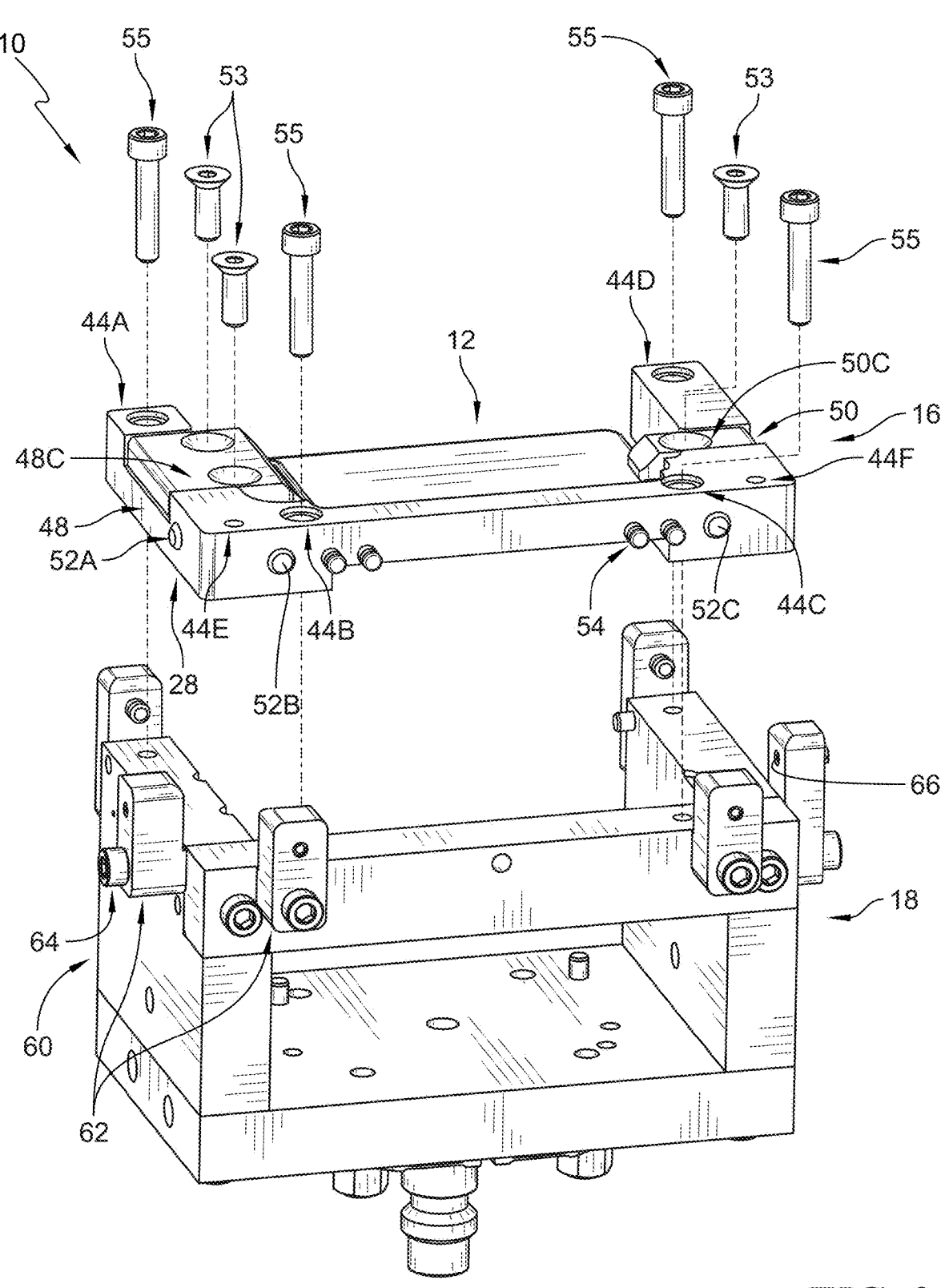
FIG. 8 is an exploded view of the workpiece frame and the exemplary tool base showing that a plurality of fasteners extend through the C-shaped body and into the tool base to couple the C-shaped body to the tool base during machining of the workpiece.

The first arm 34, the second arm 36, the third arm 38, second clamp plate 48B, and the fourth clamp plate 50B are integrally formed as a single one-piece component, as shown in FIG. 5. The second clamp plate 48B and the fourth clamp plate 50B are illustratively immovable surfaces integral to the body 28. The workpiece 12 rests on these immovable clamp plates 48B, 50B, as suggested in FIG. 7. In some embodiments, the first clamp plate 48A is moveable relative to the first arm 34 and the second clamp plate 48B, and the third clamp plate 50A is moveable relative to the second arm 36 and the fourth clamp plate 50B. In such an embodiment, the first clamp plate 48A and the second clamp plate 48B are formed to include at least one through hole 48C, and the third clamp plate 50A and the fourth clamp plate 50B are formed to include at least one through hole 50C. A fastener 53 extends through at least one through hole 48C of the first and second clamp plates 48A, 48B to couple the first clamp plate 48A to the second clamp plate 48B, as shown in FIGS. 7 and 8. The fastener 53 may be tightened or loosened to move the first clamp plate 48A toward or away from the second clamp plate 48B to securely hold the workpiece 12 between the clamp plates 48A, 48B and to remove the workpiece 12 from between the clamp plates 48A, 48B. In some embodiments, at least one through hole 48C includes two through holes 48C.

Another fastener 53 extends through at least one through hole 50C of the third and fourth clamp plates 50A, 50B to couple the third clamp plate 50A to the fourth clamp plate 50B, as shown in FIGS. 7 and 8. The fastener 53 may be tightened or loosened to move the third clamp plate 50A toward or away from the fourth clamp plate 50B to securely hold the workpiece 12 between the clamp plates 50A, 50B and to remove the workpiece 12 from between the clamp plates 50A, 50B.

The workpiece 12 is located in the workpiece-receiving space 40, as shown in FIG. 3. The first end of the workpiece 12 is clamped between the first clamp plate 48A and the second clamp plate 48B, and the second end of the workpiece 12 is clamped between the third clamp plate 50A and the fourth clamp plate 50B to couple the workpiece 12 to the body 28.

The C-shaped body 28 provides open access to the edge 26 of the workpiece 12, as shown in FIGS. 2 and 3. This open access allows the machine 14 to more readily modify the workpiece 12. The C-shaped body 28, thus, provides access to three sides of the workpiece 12, including the first side 22, the second side 24, and the edge 26.

The plurality of workpiece locating protrusions 46 extends into the workpiece-receiving space 40 from the body 28 to contact the workpiece 12 and to locate the workpiece 12 within the workpiece-receiving space relative 40 to the body 28, as shown in FIGS. 5 and 6. The plurality of workpiece locating protrusions 46 illustratively includes a first protrusion 46A, a second protrusion 46B, and a third protrusion 46C. The first protrusion 46A extends from the third arm 38 of the body 28 into the workpiece-receiving space 40. The second protrusion 46B extends from the third arm 38 of the body 28 into the workpiece-receiving space 40 and is spaced apart from the first protrusion 46A along the third arm 38. The third protrusion 46C extends from the second arm 36 of the body 28 into the workpiece-receiving space 40.

The first and second protrusions 46A, 46B contact an edge of the workpiece 12 opposite the edge 26, while the third protrusion 46C contacts another edge of the workpiece 12, as shown in FIGS. 5 and 6. The protrusions 46A, 46B, 46C ensure that the workpiece 12 is properly positioned within the workpiece-receiving space 40 of the body 28. For example, the first and second protrusions 46A, 46B ensure that the workpiece 12 is properly positioned within the workpiece-receiving space 40 relative to the third arm 38. The third protrusion 46C ensures that the workpiece 12 is properly positioned within the workpiece-receiving space 40 relative to the first and second arms 34, 36 of the body 28. In some embodiments, the protrusions 46A, 46B, 46C are integrally formed with the body 28.

The frame locator 32 is located outside of the workpiece-receiving space 40 of the body 28, as shown in FIGS. 3 and 4. The frame locator 32 ensures that the body 28 is properly positioned on the tool base 18, thereby ensuring that the workpiece 12 is properly positioned relative to the tool base 18 and the shaft 20.

The frame locator 32 includes a plurality of fastener holes 44, a plurality of frame locating datums 52, and a plurality of pins 54, as shown in FIG. 4. The plurality of fastener holes 44 is used to couple the body 28 to the tool base 18. The plurality of frame locating datums 52 is used to position the body 28 relative to the tool base 18. The plurality of pins 54 is configured to couple to a portion of the machine 14 to couple the portion of the machine 14 to the workpiece frame 16. For example, the portion of the machine 14 may be a flow block that couples with the workpiece frame 16 to direct the electrolyte through the gap formed between the workpiece 12 and the shaft 20.

The plurality of fastener holes 44 illustratively includes a first hole 44A, a second hole 44B, a third hole 44C, a fourth hole 44D, a fifth hole 44E, and a sixth hole 44F, as shown in FIG. 3. Though shown with six holes 44A, 44B, 44C, 44D, 44E, 44F, additional holes or fewer holes are contemplated. The first hole 44A is formed to extend through the first arm 34. The second hole 44B, the third hole 44C, the fifth hole 44E, and the sixth hole 44F are formed to extend through the third arm 38. The fourth hole 44D is formed to extend through the second arm 36. The first, second, third, and fourth holes 44A, 44B, 44C, 44D each have a first diameter. The fifth and sixth holes 44E, 44F each have a second diameter that is less than the first diameter.

In some embodiments, the first, second, third, and fourth holes 44A, 44B, 44C, 44D are configured to receive fasteners 55 therein to couple the body 28 to the tool base 18, as shown in FIGS. 7 and 8. In some embodiments, the fifth and sixth holes 44E, 44F are configured to receive dowels (not shown) therein to couple the body 28 to the tool base 18. Depending on the tool base 18, the fifth and sixth holes 44E, 44F may not be used.

The plurality of frame locating datums 52 may be referred to as secondary and tertiary datums 52. The secondary and tertiary datums 52 illustratively include a first datum 52A, a second datum 52B, and a third datum 52C, as shown in FIG. 4. Though shown with three secondary and tertiary datums 52A, 52B, 52C, additional datums or fewer datums are contemplated. The first datum 52A, which may be referred to as the tertiary datum 52A, is coupled to the first arm 34 of the body 28 to extend outwardly away from the first arm 34 and the workpiece-receiving space 40. The first datum 52A extends outwardly from the first arm 34 beyond a surface of the first arm 34 that faces away from the workpiece-receiving space 40. The second datum 52B, which may be referred to as the secondary datum 52B, is coupled to the third arm 38 of the body 28 to extend outwardly away from the third arm 38 and the workpiece-receiving space 40. The second datum 52B extends outwardly from the third arm 38 beyond a surface of the third arm 38 that faces away from the workpiece-receiving space 40. The third datum 52C, which may be referred to as the secondary datum 52C, is coupled to the third arm 38 of the body 28 and spaced apart from the second datum 52B along the third arm 38. The third datum 52C extends outwardly away from the third arm 38 beyond the surface of the third arm 38 that faces away from the workpiece-receiving space 40.

Illustratively, each of the secondary and tertiary datums 52A, 52B, 52C is received in a corresponding hole formed in the body 28, as shown in FIG. 4. Each datum 52A, 52B, 52C is received in the corresponding hole to extend outwardly beyond the corresponding surface of the corresponding arm 34, 38. The secondary and tertiary datums 52A, 52B, 52C cooperate with the primary datums (the substantially planar surfaces of the arms 34, 36, 38) to help ensure proper alignment of the body 28 with the tool base 18. After the body 28 is aligned with the tool base 18 via the primary datums and the secondary/tertiary datums 52A, 52B, 52C, the fasteners 55 may be inserted into the plurality of holes 44 to secure the workpiece frame 16 to the tool base 18.

The plurality of pins 54 is coupled to and extends outwardly away from the third arm 38 of the body 28, as shown in FIGS. 3, 5, and 6. The plurality of pins 54 illustratively includes a first pin 54A, a second pin 54B, a third pin 54C, and a fourth pin 54D. Though shown and described as including four pins 54, additional pins or fewer pins are contemplated.

Each of the pins 54A, 54B, 54C, 54D extends outwardly away from the workpiece-receiving space 40, as shown in FIGS. 5 and 6. Each of the pins 54A, 54B, 54C, 54D extends outwardly from the third arm 38 of the body 28 beyond the surface of the third arm 38 that faces away from the workpiece-receiving space 40.

Illustratively, each of the pins 54A, 54B, 54C, 54D is received in a corresponding hole formed in the body 28, as suggested in FIG. 4. Each of the pins 54A, 54B, 54C, 54D is received in the corresponding hole to extend outwardly beyond the surface of the third arm 38 beyond the second and third datums 52B, 52C. The pins 54A, 54B, 54C, 54D are located between the second datum 52B and the third datum 52C along the third arm 38. Each of the pins 54A, 54B, 54C, 54D extend parallel with each other.

As previously described, the plurality of pins 54 is configured to couple to a portion of the machine 14 to couple the portion of the machine 14 to the workpiece frame 16. For example, the portion of the machine 14 may be the flow block. The plurality of pins 54 may only be used when the flow block is coupled with the workpiece frame 16.

In some embodiments, the body 28 may be formed to include a first pocket 56 and a second pocket 58, as shown in FIGS. 5 and 6. The pockets 56, 58 are illustratively formed as recesses in the third arm 38. The pockets 56, 58 are formed on opposing sides of the third arm 38. Depending on the type of the machine 14, the pockets 56, 58 may provide tool clearance. The pockets 56, 58 may also act as locating features for a portion of the machine 14, such as the flow block.

An exemplary tool base 18 is shown in FIGS. 7 and 8. In some embodiments, the tool base 18 is configured to be coupled with a base of the machine 14. The tool base 18 includes a foundation 60 and a plurality of locator blocks 62 coupled to the foundation 60 via fasteners 64. Each of the plurality of locator blocks 62 includes a locator protrusion 66 extending outwardly therefrom toward the workpiece frame 16 to engage the corresponding secondary/tertiary datum 52. The plurality of locator blocks 62 allows the workpiece frame 16, and thus the workpiece 12, to be flipped 180 degrees between a first orientation and a second orientation such that both sides 22, 24 of the workpiece 12 may be modified. When using the exemplary tool base 18, the workpiece 12 is substantially horizontal when coupled with the tool base 18.

In some embodiments, the machine tool system 10 includes additional machines beyond the machine 14. For example, the machine tool system 10 may include the machine 14 capable of PECM and a second machine (not shown) capable of another type of machining. The PECM machine uses the substantially planar surfaces of the arms 34, 36, 38 as primary datums to help gain surface area for power transfer. The second machine includes a tool base, similar to or the same as the tool base 18, and a shaft. The second machine may use specific probing points on the substantially planar surfaces of the arms 34, 36, 38 as primary datums. For example, the second machine may use four specific probing points.

The workpiece frame 16 is repositionable on the machine 14 and relocatable to the second machine. Thus, the workpiece 12 may be transferred to the second machine without requiring removal of the workpiece 12 from the workpiece frame 16. On the second machine, the workpiece frame 16 may be placed in different positions such that the workpiece 12 is positioned in different orientations. For example, the workpiece frame 16 may be positioned such that the body 28 opens to the right and the workpiece 12 is substantially vertical. As another example, the workpiece frame 16 may be positioned such that the body 28 opens to the left and the workpiece 12 is substantially vertical.

The second machine may be used for hole drilling via laser, cutting via laser, milling of surfaces, and/or cutting via electrical discharge machining (EDM). The second machine may also be used for inspection of the workpiece 12, for example, via non-contact three-dimensional scanning via blue light. The shaft of the second machine may move, similar to the shaft 20, or may remain stationary. The second machine may be a single axis machine or a multi axis machine.

The second machine may use the same primary and secondary/tertiary datums 52A, 52B, 52C as the machine 14. The second machine may use different primary and secondary/tertiary datums 52A, 52B, 52C than the machine 14. The second machine may use different holes 44A, 44B, 44C, 44D, 44E, 44F than the machine 14 to couple the workpiece frame 16 to the tool base 18. For example, depending on the capabilities of the machine 14, the machine 14 may only use the holes 44A, 44B, 44C, 44D to secure the workpiece frame 16 to the tool base 18, such as with the exemplary tool base 18 shown in FIGS. 7 and 8. In particular, the machine 14 capable of PECM may only use the holes 44A, 44B, 44C, 44D to secure the workpiece frame 16 to the tool base 18. Other machines, such as machines capable of lasering, milling, or inspecting, may use all the holes 44A, 44B, 44C, 44D, 44E, 44F to secure the workpiece frame 16 to the tool base.

The machine tool system 10 may include any combination of machines. For example, the machine tool system 10 may include the machine 14, the second machine capable of hole drilling via laser, a third machine capable of milling, a fourth machine capable of inspection, etc.

A method of modifying the workpiece 12 is provided herein. The method includes supporting the workpiece 12 on the workpiece frame 16. The method includes positioning the workpiece frame 16 on the machine 14 in the first position. While the workpiece frame 16 is in the first position, the method includes modifying the first side 22 of the workpiece 12 via the shaft 20 of the machine 14 that moves along the first axis A. The method includes removing the workpiece frame 16 from the machine 14. The method includes repositioning the workpiece frame 16 on the machine 14 in the second position different than the first position. While the workpiece frame 16 is in the second position, the method includes modifying the second side 24 of the workpiece 12 opposite the first side 22 via the shaft 20 of the machine 14 that moves along the first axis A.

In some embodiments, the method may further include removing the workpiece frame 16 from the machine 14 and repositioning the workpiece frame 16 on the machine 14 in a third position different than the first position and the second position. While the workpiece frame 16 is in the third position, the method may include modifying the edge 26 of the workpiece 12 that interconnects the first side 22 and the second side 24 via the shaft 20 of the machine 14 that moves along the first axis A.

In some embodiments, the step of supporting the workpiece 12 on the workpiece frame 16 includes moving the workpiece 12 into engagement with the plurality of workpiece locating protrusions 46 of the workpiece frame 16 to position the workpiece 12 relative to and within the workpiece-receiving space 40 of the body 28 of the workpiece frame 16.

In some embodiments, the step of positioning the workpiece frame 16 on the machine 14 in the first position includes moving the workpiece frame 16 into contact with the machine 14 so that the frame locator 32 of the workpiece frame 16 contacts the machine 14 to position the body 28 relative to the machine 14.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A machine tool system comprising:
a three-dimensional workpiece,
a machine configured to modify the three-dimensional workpiece,
the machine including a tool base configured to support the three-dimensional workpiece and a shaft spaced apart from the tool base along a first axis and configured to move along the first axis relative to the tool base to modify the three-dimensional workpiece, and
a workpiece frame that is repositionable and relocatable on the tool base in at least two different orientations to support the three-dimensional workpiece in the at least two different orientations relative to the first axis during modification of the three-dimensional workpiece so that different sides of the three-dimensional workpiece are modified without requiring removal of the three-dimensional workpiece from the workpiece frame,
wherein the workpiece frame includes a C-shaped body configured to be coupled to the tool base and defining a workpiece-receiving space therein, a workpiece locator that extends from the C-shaped body into the workpiece-receiving space and into contact with the three-dimensional workpiece to support and position the three-dimensional workpiece relative to the C-shaped body, and a frame locator arranged outside of the workpiece-receiving space and extending away from the C-shaped body and into contact with the tool base to position the C-shaped body relative to the tool base so that the three-dimensional workpiece is properly aligned with the shaft in the at least two different orientations,
wherein the C-shaped body of the workpiece frame includes a first arm, a second arm spaced apart from the first arm, and a third arm extending between and interconnecting terminal ends of the first arm and the second arm, and wherein the workpiece locator includes a first clamp member coupled to the first arm of the C-shaped body, the first clamp member having a first clamp plate that extends inwardly from the first arm toward the second arm and a second clamp plate spaced apart from the first clamp plate and extending inwardly from the first arm toward the second arm, the first and second clamp plates being spaced apart from the third arm along the first arm.

2. The machine tool system of claim 1, wherein the first arm, the second arm, and the third arm cooperate to define the workpiece-receiving space.

3. The machine tool system of claim 2, wherein the frame locator includes a plurality of frame locating datums positioned outside of the workpiece-receiving space and extending from the C-shaped body and into contact with the tool base to locate the C-shaped body relative to the tool base, and wherein the plurality of frame locating datums includes a first datum coupled to the first arm of the C-shaped body to extend outwardly therefrom beyond a surface of the first am, a second datum coupled to the third arm of the C-shaped body to extend outwardly therefrom beyond a surface of the third arm, and a third datum coupled to the third arm of the C-shaped body to extend outwardly therefrom beyond the surface of the third am and spaced apart from the second datum.

4. The machine tool system of claim 3, wherein the frame locator further includes a plurality of pins arranged outside of the workpiece-receiving space and extending from the C-shaped body and into contact with a portion of the machine to couple the portion of the machine with the workpiece frame, and wherein each of the plurality of pins is coupled to the third arm of the C-shaped body and located between the second datum and the third datum along the third arm.

5. The machine tool system of claim 2, wherein the first clamp member is configured to hold the three-dimensional workpiece in a stationary position relative to the C-shaped body of the workpiece frame.

6. The machine tool system of claim 5, wherein the first clamp member is configured to support a first end of the three-dimensional workpiece and the workpiece locator further includes a second clamp member extending inwardly from the second arm of the C-shaped body toward the first arm to support a second end of the three-dimensional workpiece opposite the first end.

7. The machine tool system of claim 6, wherein the second clamp member includes a third clamp plate and a fourth clamp plate spaced apart from the third clamp plate to locate the second end of the three-dimensional workpiece between the third clamp plate and the fourth clamp plate, the third and fourth clamp plates being spaced apart from the third arm along the second arm.

8. The machine tool system of claim 1, wherein the workpiece locator further includes a plurality of workpiece locating protrusions extending from the C-shaped body into the workpiece-receiving space and into contact with the three-dimensional workpiece to locate the three-dimensional workpiece within the workpiece-receiving space relative to the C-shaped body.

9. The machine tool system of claim 8, wherein the plurality of workpiece locating protrusions includes a first protrusion extending from the third arm of the C-shaped body into the workpiece-receiving space, a second protrusion extending from the third arm of the C-shaped body into the workpiece-receiving space and spaced apart from the first protrusion along the third arm, and a third protrusion extending from the second arm of the C-shaped body toward the first arm and into the workpiece-receiving space.

10. A machine tool system comprising:
a workpiece,
a machine configured to modify the workpiece, and
a workpiece frame that is repositionable and relocatable on the machine in at least two different orientations to support the workpiece in the at least two different orientations during modification of the workpiece so that different sides of the workpiece are modified without requiring removal of the workpiece from the workpiece frame,
wherein the workpiece frame includes a body configured to be coupled to the machine and defining a workpiece-receiving space therein, a workpiece locator that extends from the body into the workpiece-receiving space and into contact with the workpiece to support and position the workpiece relative to the body, and a frame locator arranged outside of the workpiece-receiving space and extending away from the body to position the body relative to the machine, wherein the body of the workpiece frame includes a first arm, a second arm spaced apart from the first arm, and a third arm extending between and interconnecting terminal ends of the first arm and the second arm, wherein the workpiece locator includes a first protrusion extending from the third arm of the body into the workpiece-receiving space, a second protrusion extending from the third arm of the body into the workpiece-receiving space and spaced apart from the first protrusion along the third arm, and a third protrusion extending from the second arm of the body toward the first arm, the first, second, and third protrusions being integrally formed with the body.

11. The machine tool system of claim 10, wherein the first arm, the second arm, and the third arm cooperate to define the workpiece-receiving space.

12. The machine tool system of claim 11, wherein the frame locator includes a plurality of frame locating datums positioned outside of the workpiece-receiving space and extending from the body and into contact with the machine to locate the body relative to the machine, and wherein the plurality of frame locating datums includes a first datum coupled to the first arm of the body and extending outwardly therefrom, a second datum coupled to the third arm of the body and extending outwardly therefrom, and a third datum coupled to the third arm of the body and spaced apart from the second datum, the third datum extending outwardly from the third arm of the body.

13. The machine tool system of claim 11, wherein the workpiece locator includes a first clamp member extending from the first arm of the body toward the second arm and a second clamp member extending from the second arm of the body toward the first arm.

14. The machine tool system of claim 13, wherein the first clamp member includes a first clamp plate and a second clamp plate spaced apart from the first clamp plate to locate a first end of the workpiece between the first clamp plate and the second clamp plate, the first and second clamp plates being spaced apart from the third arm along the first arm, and wherein the second clamp member includes a third clamp plate and a fourth clamp plate spaced apart from the third clamp plate to locate a second end of the workpiece opposite the first end between the third clamp plate and the fourth clamp plate, the third and fourth clamp plates being spaced apart from the third arm along the second arm.

15. The machine tool system of claim 13, wherein the first protrusion, the second protrusion, and the third protrusion extend from the body into the workpiece-receiving space and into contact with the workpiece to locate the workpiece within the workpiece-receiving space relative to the body.

16. A method of modifying a three-dimensional workpiece, the method comprising:

supporting the three-dimensional workpiece on a C-shaped body of a workpiece frame such that a first side of the three-dimensional workpiece, a second side of the three-dimensional workpiece directly opposing the first side, and an edge of the three-dimensional workpiece that interconnects the first and second sides are accessible by a machine and not covered by the C-shaped body, positioning the workpiece frame on the machine in a first position, while the workpiece frame is in the first position, modifying the first side of the three-dimensional workpiece via a shaft of the machine that moves along a first axis, removing the workpiece frame from the machine, repositioning the workpiece frame on the machine in a second position different than the first position, and while the workpiece frame is in the second position, modifying the second side of the three-dimensional workpiece opposite the first side via the shaft of the machine that moves along the first axis.

17. The method of claim 16, wherein the C-shaped body of the workpiece frame includes a first arm, a second arm spaced apart from the first arm, and a third arm extending between and interconnecting terminal ends of the first arm and the second arm, and wherein the step of supporting the three-dimensional workpiece on a C-shaped body of a workpiece frame includes supporting the three-dimensional workpiece on a first clamp plate that extends inwardly from the first arm toward the second arm and moving a second clamp plate that extends inwardly from the first arm toward the second arm toward the first clamp plate to clamp the three-dimensional workpiece between the first and second clamp plates.

18. The method of claim 16, further comprising, after the step of repositioning, removing the workpiece frame from the machine, repositioning the workpiece frame on the machine in a third position different than the first position and the second position, and while the workpiece frame is in the third position, modifying the edge of the three-dimensional workpiece that interconnects the first side and the second side via the shaft of the machine that moves along the first axis.

19. The method of claim 16, wherein the step of supporting the three-dimensional workpiece on a C-shaped body of a workpiece frame includes moving the three-dimensional workpiece into engagement with a plurality of workpiece locating protrusions of the workpiece frame to position the three-dimensional workpiece relative to and within a workpiece-receiving space of the C-shaped body of the workpiece frame.

20. The method of claim 19, wherein the step of positioning the workpiece frame on the machine in a first position includes moving the workpiece frame into contact with the machine so that a frame locator of the workpiece frame contacts the machine to position the C-shaped body relative to the machine, the frame locator arranged outside of the workpiece-receiving space.

* * * * *